United States Patent [19]

Yoshida et al.

[11] 4,435,058

[45] Mar. 6, 1984

[54] AUTO-FOCUS CONTROL CAMERA

[75] Inventors: Fumio Yoshida, Osaka; Yukio Miki, Sakai; Takeshi Egawa; Akira Yoshizaki, both of Osaka, all of Japan

[73] Assignee: Minolta Camera Kabushiki Kaisha, Osaka, Japan

[21] Appl. No.: 349,469

[22] Filed: Feb. 17, 1982

[30] Foreign Application Priority Data

| Feb. 27, 1981 | [JP] | Japan | 56-29110 |
| Mar. 5, 1981 | [JP] | Japan | 56-32262 |
| Mar. 5, 1981 | [JP] | Japan | 56-32263 |
| Mar. 5, 1981 | [JP] | Japan | 56-32264 |
| Mar. 5, 1981 | [JP] | Japan | 56-32265 |

[51] Int. Cl.³ ............................ G03B 3/10; G03B 1/00
[52] U.S. Cl. .................................. 354/403; 354/173.1
[58] Field of Search ................... 354/25, 173, 195, 198

[56] References Cited

U.S. PATENT DOCUMENTS 4,350,418  9/1982  Taguchi et al. ..................... 354/25
4,370,043  1/1983  Harigaya et al. ................... 354/173

*Primary Examiner*—Michael L. Gellner
*Attorney, Agent, or Firm*—Watson, Cole, Grindle & Watson

[57] ABSTRACT

An auto-focus control camera includes an arrangement for measuring distance to a subject to be photographed, a calculator for calculating the degree of out of focus and an actuator for actuating a motor that shifts camera picture taking lens to a proper focus position according to the calculated result. The auto-focus control camera further includes a detector for detecting a time it takes for the arrangement of distance measuring and calculator to complete its operation. If the detected time is within a predetermined time period, the actuator is made operative to complete the photographing operation with auto-focusing, and if the detected time is longer than the predetermined time period, the photographing operation is carried out without auto-focusing.

30 Claims, 10 Drawing Figures

| MODES \ SWITCHES | S1 | S2 | S8 | S12 | S13 | S15 |
|---|---|---|---|---|---|---|
| MODE i | OFF | a | OFF | OFF | OFF | 58 |
| MODE ii | 〃 | 〃 | ON | ON | OFF | 〃 |
| MODE iii | ON | 〃 | OFF | OFF | ON | 〃 |
| MODE iv | 〃 | 〃 | ON | ON | 〃 | 〃 |
| MODE v  1ST SUB | 〃 | b | 〃 | 〃 | 〃 | 83 |
| 2D SUB | 〃 | b | 〃 | 〃 | 〃 | 58 |
| 3D SUB | 〃 | c | 〃 | 〃 | 〃 | 〃 |

Fig. 9

| MODES \ SWITCHES | S1 | S8 | S12 | S13 | S14 | S15 |
|---|---|---|---|---|---|---|
| MODE i | OFF | OFF | OFF | OFF | ON | 58 |
| MODE ii  1ST SUB | 〃 | ON | ON | 〃 | OFF | 83' |
| 2D SUB | 〃 | 〃 | 〃 | 〃 | ON | 58 |
| MODE iii | ON | OFF | OFF | ON | ON | 58 |
| MODE iv | 〃 | ON | ON | 〃 | 〃 | 〃 |
| MODE V  1ST SUB | 〃 | 〃 | 〃 | 〃 | OFF | 83' |
| 2D SUB | 〃 | 〃 | 〃 | 〃 | 〃 | 58 |

Fig. 10

AUTO-FOCUS CONTROL CAMERA

BACKGROUND OF THE INVENTION

1. Field of the Invention

The present invention relates to a camera having an auto-focus control system.

2. Description of the Prior Art

Generally, an auto-focus control camera inevitably includes a step of operation for automatically adjusting the focus of camera between the moment of the depression of the shutter button and the initiation of the exposure, and such a step of automatic focus adjusting operation requires an appreciable amount of time. Therefore, when compared with conventional cameras having no auto-focus system, in which the focus adjustment is manually practiced prior to the depression of the shutter button, the auto-focus control camera requires a greater time from the moment when the shutter button is depressed until the initiation of the exposure.

Furthermore, in the case of an auto-focus control camera equipped with a motor drive system that automatically winds up the film to successively carry out a plurality of photographing operations during the depression of the shutter button, the maximum speed of frame advance, or the minimum period between the successive shots, is restricted by the time necessary to carry out the automatic focus adjusting operation.

Further, if the time necessary to carry out the auto-focus operation varies depending on the conditions, such as the brightness of the subject to be photographed and the amount of required lens shift, the time necessary to carry out the auto-focus operation would greatly interfere with the desired frame advance speed. Particularly when the means for obtaining information necessary to shift the lens is formed by an array of photoelectric sensors, the time necessary to carry out the operation for obtaining information of the value of shifting the lens varies greatly on the brightness of the subject such that the auto-focus adjusting operation takes a longer time as the brightness of the subject to be photographed becomes darker.

For example, when the array of photoelectric sensors is formed by a CCD element that can detect a pattern of image of the subject, its response speed depends greatly on the brightness of the subject. An example of such an array of photoelectric sensors is disclosed in detail in U.S. Pat. No. 4,185,191 to N. L. Stauffer. Furthermore, such an array of sensors must be coupled with a calculation circuit which usually proceeds calculation in digital form. Thus, an analog-to-digital converter must be inserted between the array of sensors and the calculation circuit. The employment of these circuits in longer time before the auto-focus information obtaining operation is completed. For example, the auto-focus information obtaining operation for the bright subject takes several 10 ms, whereas that for the less bright subject takes several 100 ms.

Therefore, there has been a problem of employing an auto-focus control system defined by the array of photoelectric sensors in a camera because of such a time lag between the shutter button depression and actual exposure. This problem is much serious for the cameras equipped with the motor drive.

SUMMARY OF THE INVENTION

The present invention has been developed with a view to substantially solving the above problems and has for its essential object to provide an improved auto-focus control camera.

It is another object of the present invention to provide an auto-focus control camera of the above described type which is applicable to an auto-focus control camera equipped with a motor drive.

It is a further object of the present invention to provide an auto-focus control camera having means for photoelectrically obtaining information for an auto-focus adjustment, or operation, by way of reflex mirror in a projected position, which camera can reduce the time necessary to carry out one photographing operation.

According to the auto-focus control camera of the present invention, it is an outstanding feature thereof so that an auto-focus adjustment, or operation, is automatically omitted when the time necessary to carry out the auto-focus adjustment exceeds a period of time for realizing the successive motor driven shots with a given period is detected or expected. In this case, the camera's picture taking lens is maintained in a position adjusted in the preceding shot. The omission of the auto-focus adjustment saves time and realizes the frame advance in a required speed under the motor drive operation. In the successive photographing operations by the motor drive system, the distance to the subject will not vary much, and therefore, the maintaining of the lens position set in the former shot will not result in serious out of focus.

It is another outstanding feature of the present invention that information related to time required to carry out the auto-focus adjustment is indicated. Such an indication can be understood as a value representing the time required to carry out the auto-focus adjustment or a warning indicating that the time required to carry out the auto-focus adjustment exceeds a predetermined period of time. When an operator sees such an indication, he is informed that the successive motor driven shots will not be carried out with a desired period. In this case, he may change the setting of the period into a longer value.

It is a further outstanding feature of the present invention that the camera operates in two major modes which the operator can select. One major mode is a frame advance speed preferred mode in which the frame advance speed is maintained constant according to the set speed and the auto-focus adjustment operation is carried out only when the auto-focus adjustment can be done within a predetermined period of time for realizing the frame advancement speed. Another major mode is an auto-focus preferred mode in which the frame advance speed is automatically reduced from a set value to permit the auto-focus operation effected in each photographing operation no matter how long it takes.

It is a still further outstanding feature of the present invention that the time necessary to carry out one photographing operation can be shortened. Namely, the time from the completion of the auto-focus information obtaining operation to the initiation of the exposure in one shot is reduced by means of parallelly operating the focus adjustment operation and the mirror flip-up and diaphragm stopping-down operation. Or, the periods between the successive motor driven shots are reduced by means of parallelly operating the mirror and diaphragm returning operation and the film winding-up operation after the completion of the exposure to hasten both the initiation of the auto-focus information obtaining operation and the termination of the film winding-up operation for the next shot. Such arrangements are quite favorable to an auto-focus camera of a type in which the auto-focus information is obtained from a light transmitted by way of the reflex mirror in the projected position.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which;

FIG. 9 is a table showing the condition of switches employed in the circuit of FIG. 8 under different modes of operations; and FIG. 10 is a circuit diagram of a logic circuit employed in a camera, according to a third embodiment of the present invention.

DESCRIPTION OF THE PREFERRED EMBODIMENTS

First Embodiment

Figure 1:
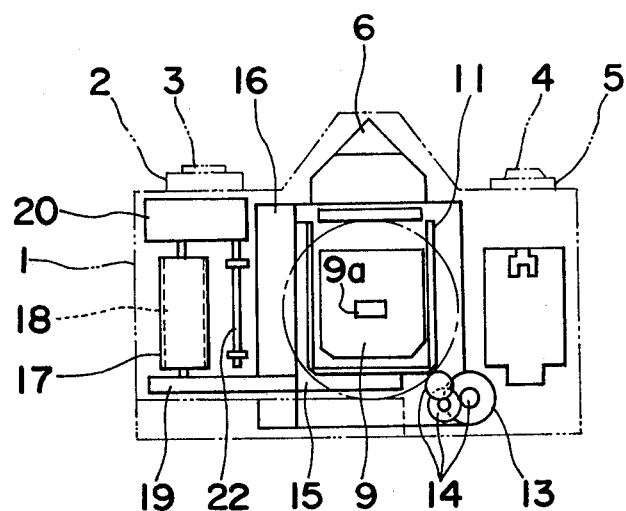
FIG. 1 is a diagrammatic illustration showing a front view of an auto-focus control camera according to the present invention.
Figure 2:
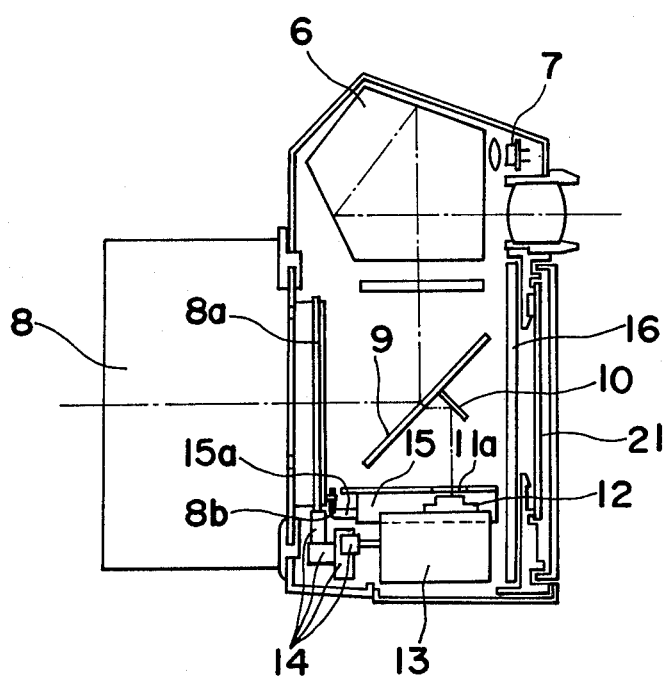
FIG. 2 is a diagrammatic illustration showing a side view of an auto-focus control camera according to the present invention.

REFERRING TO FIGS. 1 and 2, the major mechanical portions of an auto-focus control camera according to a preferred embodiment of the present invention are shown in a simplified manner. The camera shown in FIGS. 1 and 2 is a signal lens reflex camera with through-the-lens metering and viewing. Furthermore, the camera shown is equipped with a motor drive which automatically winds the film and releases the shutter for taking pictures in rapid succession and an auto-focucing device which automatically shifts the camera picture-taking lens to a proper focusing position with respect to an aimed subject to be photographed.

The camera shown in FIGS. 1 and 2 includes a camera body 1, a shutter speed setting dial 2, a shutter button 3, a film rewinding actuator 4 and a photographing mode selection dial 5. The mode selection dial 5 offers a selection of five modes which are:

(i) single photographing mode (Operator adjusts focus, and a depression of a shutter button effects only one shutter release.);

(ii) auto-focus single photographing mode (camera adjusts focus, and a depression of a shutter button effects only one shutter release.);

(iii) successive photographing mode (Operator adjusts focus, and a depression of a shutter button effects successive shutter release operations with a preselected frame advance speed, i.e., with a preselected interval between two successive photographing operations.);

(iv) auto-focus preferred successive photographing mode (Camera adjusts focus, and a depression of a shutter button effects successive shutter release operations with an auto-focus operation effected in each shutter release operation. The frame advance speed is dependent on the response speed of the focus adjustment carried out by the camera.); and (v) frame-advance-speed preferred successive photographing mode (Camera adjusts focus, and a depression of a shutter button effects successive shutter release operations. The frame advance speed ia generally maintained constant according to the set advance speed. The auto-focus operation can be carried out only in the first shutter release operation forcibly, or in all the shutter release operations provided that if the auto-focus operation takes less time than the interval between successive photographing.

If it takes longer than that, a previously obtained focus information is used.)

The detail of each of the above described modes is explained later.

The camera further includes a penta-prism 6, a light receiving element 7 formed by a photoconductor, such as CdS (cadmium sulfide), or by a photoelectric element, such as a SPD (silicon photodiode) for producing an electric signal correlative to the light intensity of the subject to be photographed, and a picture-taking lens detachably mounted on the camera body 1.

A reflex mirror 9 is pivotally provided in the camera body 1 for effecting a pivotal movement towards the penta-prism 6. The reflex mirror 9 has a center portion provided with a transparent or translucent plate 9a for allowing light from the lens 8 to pass therethrough to an auxiliary mirror 10 perpendicularly provided on the back of the mirror 9. The light which has passed through the plate 9a and reflected on the mirror 10 further passes through an opening 11a formed on a bottom plate of a mirror box 11 and impinges on a focus detection module 12. The details of the module 12 are disclosed in U.S. Pat. No. 4,185,191 to N. L. Stauffer.

A motor 13 capable of rotating in both directions is connected through a train of gears 14 to a gear 8a provided on the perimeter of the lens 8 for shifting the picture-taking lens 8. An actuator 15 is provided for shifting reflex mirror 9 and the auxiliary mirror 10 such that when taking a photograph, the actuator 15 moves the reflex mirror 9 and the auxiliary mirror 10 upwardly for allowing transmission of light from the lens 8 towards the surface of a film 21. The actuator 15 is also provided in association with a diaphragm (not shown) such that when an arm 15a extending from the actuator 15 stops pressing a diaphragm control lever 8b, it allows the shifting of the control lever 8b to a preset position, and thus, the diaphragm is stopped-down to a desired size. A shutter mechanism 16 is understood as including leading and trailing curtains (not shown) and means for holding the curtains in charged position.

A spool 17 is formed with a cavity in which a charge motor 18 is mounted. The charge motor 18 is coupled with a link mechanism 19 for effecting the shutter charge, and is also coupled with a mechanism 20 for effecting the film winding. Another spool 22 having sprockets is provided adjacent to the spool 17 for effecting the advance of the film 21 by the engagement between the perforations in the film and the sprocket. It is to be noted that the amount of film advance is controlled by the degree of rotation of the spool 22.

Next, an electric circuit for controlling the sequence of operation of the above described mechanical arrangement is described in association with the mechanical arrangement.

Figure 3:
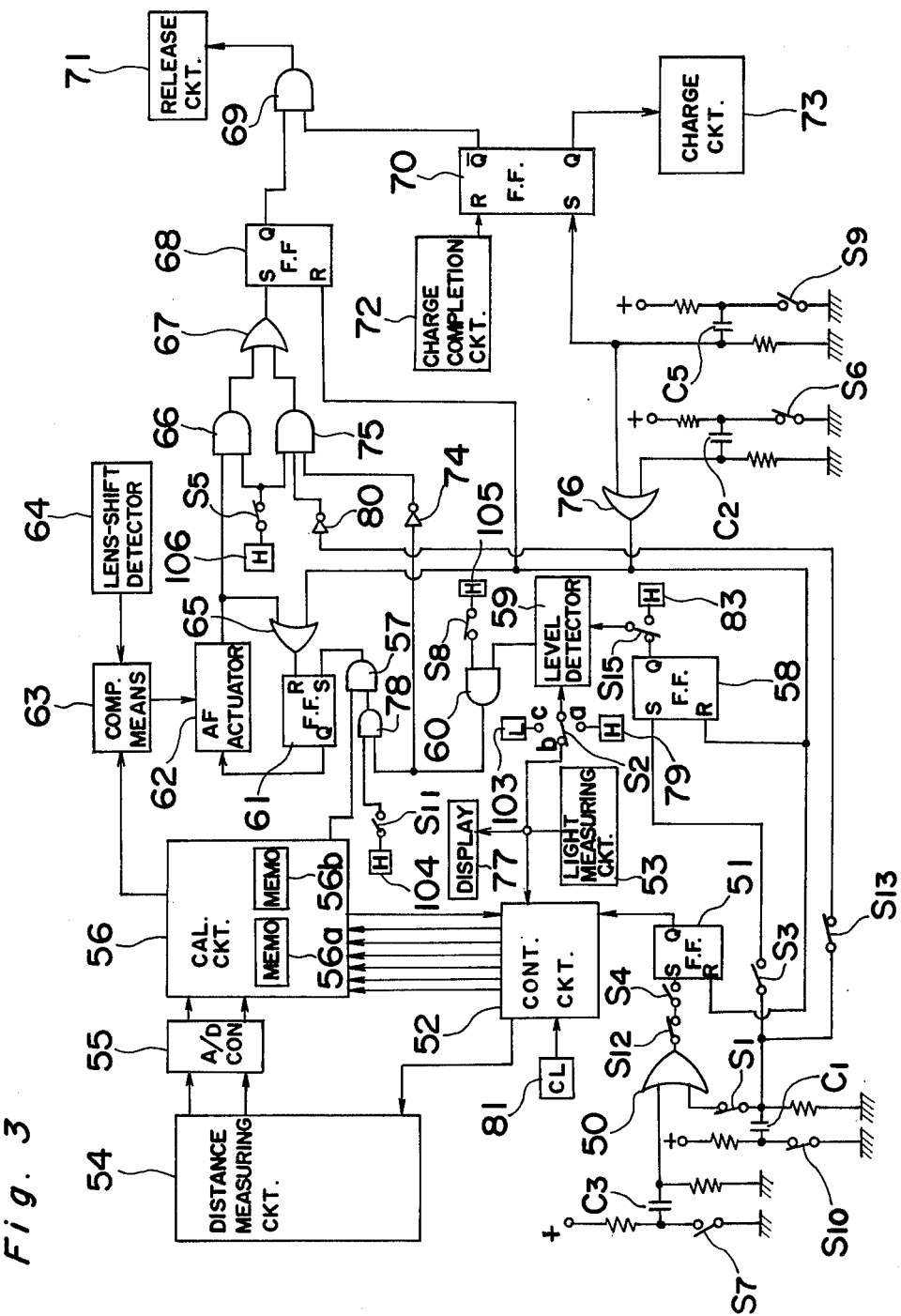
FIG. 3 is a circuit diagram of a logic circuit employed in a camera, according to a first embodiment of the present invention.

Referring to FIG. 3, a logic circuit according to the first embodiment of the present invention is shown. The description below is given in relation to each of the five modes, described as selected by the mode selection dial 5, in the order of:

(v) frame-advance-speed preferred successive photographing mode (According to the first embodiment, there are three submodes in this mode v.);

(iv) auto-focus preferred successive photographing mode;

(iii) successive photographing mode;

(ii) auto-focus single photographing mode; and (i) manual-focus single photographing mode, from the view point of structure and function.

(v) Frame-Advance-Speed Preferred Successive Photographing Mode

Figures 4, 5:
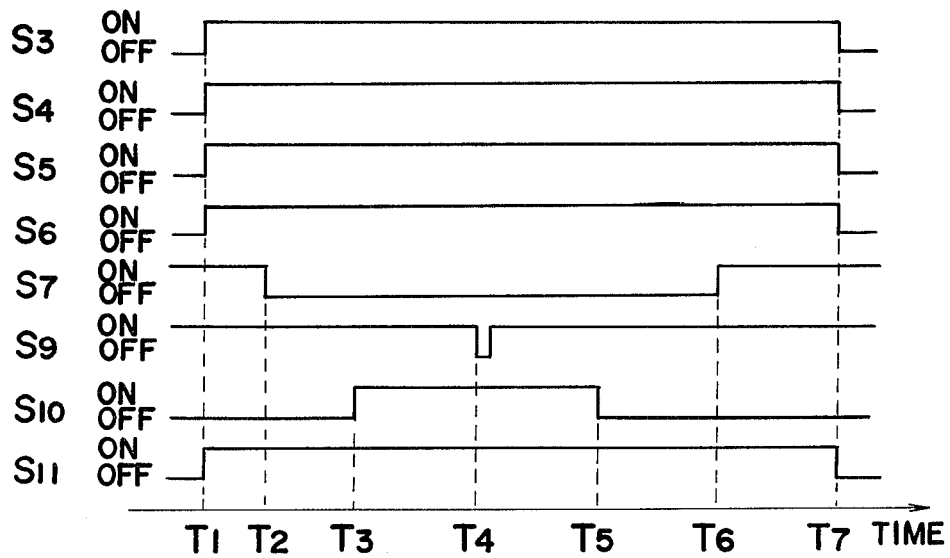
FIG. 4 is a table showing the condition of switches employed in the circuit of FIG. 4 under different modes of operations.
FIG. 5 is a time chart showing the pulses resulting from the switches employed in the circuit of FIG. 4 during one photographing operation.

When the mode selection dial 5 is so turned as to select the frame-advance-speed preferred successive photographing mode v, switches S1, S8, S12 and s13 close as indicated in a table of FIG. 4. Furthermore, in the mode v, a switch S2 can be so turned as to connect its arm with a contact b or contact c, and a switch S15 can be so turned as to connect its arm with a circuit 83 or a flip-flop 58. The switches S1 and S13 are provided for selecting a mode between a single photographing mode (i or ii) and a successive photographing mode (iii, iv or v). And, the switches S12 and S8 are provided for selecting a mode between auto-focus mode (ii, iv or v) and manual distance setting mode (i or iii). When a shutter button 3 is depressed to half-way at a moment T1 shown in FIG. 5 (A time chart shown in FIG. 5 is common to all operations in modes i-v.), switches S3, S4, S5, S6 and S11 close, and when it is depressed all the way at a moment T2, a switch S7, which has been held in closed condition, opens for discharging a capacitor C3, and thus, producing a trigger pulse which is applied through an OR gate 50 to a flip-flop 51, causing the flip-flop 51 to be set in a set condition. Thereupon, the flip-flop 51 produces a high level signal from its Q-terminal, and this high level signal, referred to as a start signal, is applied to a control circuit 52. The control circuit 52 operates in synchronized relation with clock pulses obtained from a clock circuit 81 such that the control circuit 52 receives brightness a signal from a light measuring circuit 53 and produces control signals (such as a signal for starting the operation) to a distance measuring circuit 54. Furthermore, the control circuit 52 supplies control signals and timing signals to a calculation circuit 56 for generally controlling the operation thereof. The control circuit 52 includes a circuit means which produces a pulse with a pulse duration relative to the brightness or light intensity signal obtained from the light measuring circuit 53. Such a pulse is applied to the distance measuring circuit 54 as a gate signal. It is to be noted that light measuring circuit 53 produces the brightness signal upon receipt of brightness information from a light receiving element 7 provided behind the penta-prism 6, as shown in FIG. 2.

In the distance measuring circuit 54, a predetermined time period appropriate for carrying out the distance measuring is controlled by the gate signal. It is to be noted that the distance measuring circuit 54 receives and processes the distance information from the focus detection module 12, which receives light reflected from the auxiliary mirror 10, as shown in FIG. 2. The focus detection module 12 is formed by, e.g., a CCD array which is sensitive to light rays, and an example of such a module 12 is disclosed in detail in U.S. Pat. No. 4,185,191.

The distance measuring circuit 54 coupled with the focus detection module 12 produces a signal in analog form which is converted into digital form by an analog-to-digital converter 55. The converted digital signal carrying distance information is applied to the calculation circuit 56 including a shift register, RAM etc.

According to the first embodiment, the focus detection module 12 receives light rays which have passed through the camera's picture-taking lens 8, and produces two arrays of signals parallelly, each signal array carrying contrast information. Such two signal arrays are processed and transferred through the distance measuring circuit 54 and analog-to-digital converter 55, and are applied to the calculation circuit 56 in which the two signal arrays are compared with each other to find the degree of out of focus and the direction to which the picture-taking lens 8 should be shifted to get proper focus. In the calculation circuit 56, the calculated results, i.e., the degree of out of focus and the direction of lens shift, are memorized respectively in memory means 56a and 56b which are formed by the RAM. When the calculation circuit 56 completes the memorizing operation, it produces a single shot of high level signal, as a distance-measuring-completion signal, which is applied to one input of an AND gate 57.

Since the focus detection module 12, distance measuring circuit 54, analog-to-digital converter 55 and calculation circuit 56 are disclosed in U.S. Pat. No. 4,185,191, a further description thereof is omitted for the sake of brevity.

The other input of the AND gate 57 receives a signal from an AND gate 78 which receives a high level signal from a circuit 104 when the switch S11 closes and a mode control signal from an AND gate 60. The circuit 104 is a circuit that always produces a high level signal.

The two of the three submodes in the frame-advance-speed preferred successive photographing mode is selectively obtained by the turning of the mode selection dial 5 as it turns a switch S15. As shown in the table of FIG. 4, the first-submode is obtained when the switch S15 is so turned as to connect its arm with a circuit 83, which produces a high level signal, and the second-submode is obtained when the switch S15 is so turned as to connect its arm with a Q-terminal of a flip-flop 58. The arm of the switch S15 is connected to a level detector 59.

When the first-submode is selected, the frame advance speed is maintained constant from the first frame. For example, if the set frame-advance-speed is two frames per second, the frame advances every other 0.5 second from the time when the shutter button is depressed, regardless of how long the camera takes to adjust the focus. Therefore, for some frames, the camera may fail to complete the auto-focus operation because the time necessary to complete the auto-focus operation is longer than an interval between successive photographing operations. In such a case, the photographing is carried out under the condition previously set. More particularly, when aiming a target object having a relatively low brightness, the light measuring circuit 53 produces a low level signal relative to the brightness of the object. Thus, the level detector 59 produces a low level signal which is applied through the AND gates 60 and 78 to the AND gate 57 for preventing the transmission of the completion signal from the calculation circuit 56 to the flip-flop 61. Thus, the flip-flop 61 is maintained in the reset condition to maintain the auto-focus actuator 62 in the de-actuated condition. Accordingly, the lens 8 is maintained in the previously set condition.

On the contrary, when the second-submode is selected, the frame advance speed is maintained constant from the second frame. For example, if the set frame-advance-speed is two frames per second and if it takes one second to adjust the focus for the first frame, the first frame will be advanced after more than one second from the depression of shutter button and the frames thereafter will be advanced every other 0.5 second. Thus, it can be said that, in the second-submode, the first frame is advanced as if it operates in the auto-focus preferred successive photographing mode for ensuring the auto-focus operation at least in the first photograph.

Figure 6:
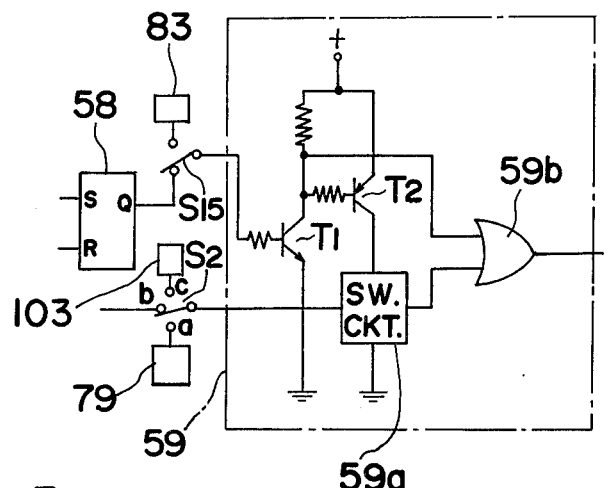
FIG. 6 is a detailed circuit diagram of a level detector shown in FIG. 3.

Referring particularly to FIG. 6, there is shown a circuit of the level detector 59. The level detector 59 includes transistors T1 and T2, a switching circuit 59a and an OR gate 59b. When the transistor T1 connected to the switch S15 receives a low level signal, the transistor T1 will be turned off and thus the transistor T2 will be turned off to interrupt the power supply to switching circuit 59a. In this case, the collector of the transistor T1 produces a high level signal which is applied through the OR gate 59b, and accordingly, the level detector 59 produces a high level signal regardless of what signal is being produced from the switching circuit 59a. However, when the transistor T1 receives a high level signal from the switch S15, the transistor T1 will be turned on and the transistor T2 will be turned on. In this case, the collector of the transistor T1 produces a low level signal to the OR gate 59b. Furthermore, the turning on of the transistor T2 supplies power to the switching circuit 59a so that the switching circuit 59a produces from its output terminal connected to the OR gate 59b a high level signal when its input terminal connected to the switch S2 receives a signal higher than a predetermined level Lx, and a low level signal when the input terminal connected to the switch S2 is lower than said predetermined level Lx. Therefore, the level of the output of level detector 59 corresponds to the level at switch S2.

Referring again to FIG. 3, since the switch S15 is connected to the flip-flop 58, the circuit shown in FIG. 3 is set in the second submode of the mode v. Since the switch S15 has been initially in reset condition, the level detector 59 receives a low level signal from the Q-terminal of the flip-flop 58, and accordingly, the level detector 59 produces a high level signal to one input of an AND gate 60.

The other input of the AND gate 60 receives a high level signal from a high-level producing circuit 105 through the switch S8, which has been turned on at the moment when the mode v has been selected. Thus, the AND gate 60 produces a high level signal which is applied to the other input of the above mentioned AND gate 78. Since the switch S11 has been turned on from the moment T1, i.e., from the depression of the shutter button 3, the AND gate 78 produces a high level signal, permitting the AND gate 57 to transfer the distance-measuring-completion signal from the calculation circuit 56 to set terminal S of a flip-flop 61. Thus, the flip-flop 61 is set for producing a high level signal from its Q-terminal, and such a high level signal is applied to an auto-focus actuator 62. The auto-focus actuator 62 is also connected to a comparing means 63 which compares a signal from the calculation circuit 56 with a signal from a lens-shift detector 64. A further detail of the auto-focus actuator 62 and its associated circuits 64, 64 and 56 is described below.

Figure 7:
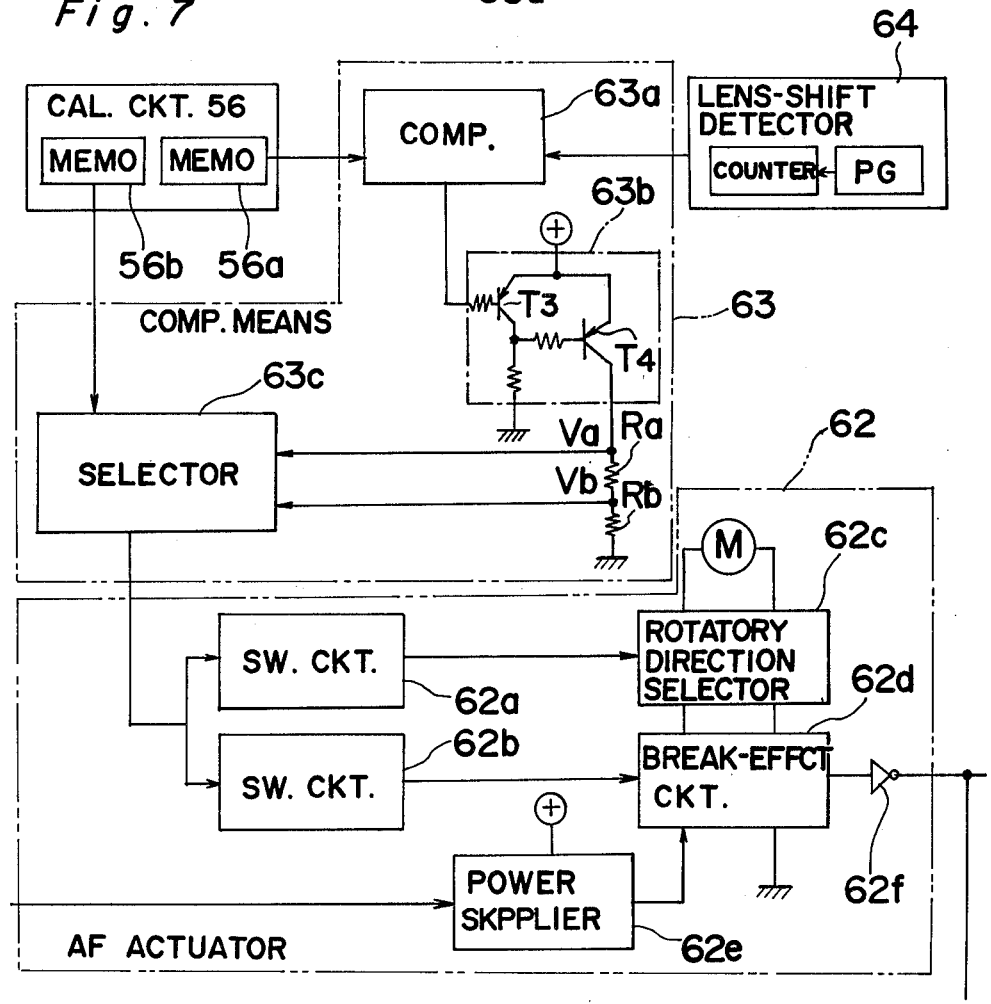
FIG. 7 is a detailed block diagram of comparator means and auto-focus actuator shown in FIG. 3.

Referring particularly to FIG. 7, the lens-shift detector 64 includes a pulse generator PG which produces a number of pulses in relation to the amount of lens shift. For example, the pulse generator PG is defined by a mechanical switch (not shown) which repeats on and off operations as the lens shifts, or may be defined by a coded plate having black and white stripes aligned alternately and a detector which photoelectrically detects the stripes. The pulses produced from the pulse generator PG is counted by a counter for the indication of lens position. The counter is set to zero before the lens shift, and is counted up regardless of direction of lens shift.

The calculation circuit 56 has the memory 56a for memorizing the degree of out of focus and the memory 56b for memorizing the direction to which the lens 8 should be shifted to get proper focus.

The comparing means 63 includes a comparator 63a which compares the counted signal from the lens-shift detector 64 with the signal representing the degree of out of focus from the memory 56a. When these two signals do not match with each other, the comparator 63a produces a high level signal, and when they match it produces a low level signal. Since the counter is reset to zero before the lens is shifted, the comparator 63a produces a high level signal unless the signal produced from the memory 56a is zero. A switching circuit 63b defined by transistors T3 and T4 receives the output of the comparator 63a. When the transistor T3 receives a high level signal from the comparator 63a, i.e., when the lens 8 is out of focus, the transistor T3 remains non-conductive to supply a low level signal to the base of the transistor T4, and accordingly, the transistor T4 conducts to flow current through resistors Ra and Rb connected in series between the transistor T4 and ground. Thus, a voltage Va is produced from a junction between the transistor T4 and the resistor Ra and voltage Vb is produced from a junction between the resistors Ra and Rb. However, when the transistor T3 receives a low level signal, i.e., when the lens 8 is in proper focus, the transistor T3 is turned on and the transistor T4 is made non-conductive, and thus, each of said junctions produce zero level voltage.

The memory 56b provided in the calculation circuit 56 produces a high level signal when the lens is out of focus closer to a hyperfocal setting and a low level signal when it is closer to near focus setting. The output of the memory 56b is connected to a selector 63c which selects the voltage Va or Vb when it receives a high or low level signal, respectively, from the memory 56b. The selected voltage Va or Vb is applied to both switching circuits 62a and 62b provided in the auto-focus actuator 62.

The switching circuit 62a has a switching level L1 (Vb<L1<Va), and the switching circuit 62b has a switching level L2 (0<L2<Vb). Each of the switching circuits 62a and 62b operates in such a manner that when the input signal thereto exceeds the respective switching level, it produces a high level signal and when the input signal falls below the respective switching level, it produces a low level signal. Accordingly, when the selector 63c produces voltage Va, both the switching circuits 62a and 62b produce a high level signal, when the selector 63c produces voltage Vb, the switching circuits 62a and 62b produce, respectively, a low and a high level signal, and when the selector 63c produces zero level voltage due to the interruption of power supply to resistors Ra and Rb by the switching circuit 63b receiving a low level signal from comparator 63a, both the switching circuits 62a and 62b produce a low level signal.

A rotatory direction selector 62c is connected to the switching circuit 62a for selecting the direction of rotation of a motor M such that when the switching circuit 62a is producing a high level signal, the motor M is so turned to shift the lens 8 towards a focus setting to a close object, and when the switching circuit 62a is producing a low level signal, the motor M is turned in opposite direction to shift the lens 8 towards hyperfocal setting.

A break-effect circuit 62d is connected to the switching circuit 62b for controlling the rotary direction selector 62c such that when the switching circuit 62b produces a high level signal, the break-effect circuit 62d allows the power supply from a power supplier 62e to continue the rotation of the motor M, and when the switching circuit 62b produces a low level signal, the break-effect circuit 62d cuts the line from the power supplier 62e and shortcircuits the lines connected to the motor actuator 62c to give a breaking effect to the motor M. Thus, the motor M stops with less inertial rotation. The power supplier 62e has its input connected to the Q-termninal of the flip-flop 61, and it supplies power to the break-effect circuit 62d when the Q-terminal of the flip-flop 61 is producing a high level signal. On the other hand, when the Q-terminal of the flip-flop 61 produces a low level signal, the power supplier 62e supplies no power to the break-effect circuit 62d, preventing any power supply to the motor M. A signal produced from an inverter 62f is low during the motor being rotated, and is high during the input lines being shortcircuited.

The operation of the circuit shown in FIG. 7 is as follows.

If the lens 8 is out of focus, the comparator 63a produces a high level signal, and accordingly, current is fed through the resistors Ra and Rb for applying voltages Va and Vb to the selector 63c. Then, the selector 63c selects and produces one voltage Va or Vb dependently on the signal obtained from the memory 56b. Since the switching level L2 of the switching circuit 62b is below the voltage Vb, the switching circuit 62b produces a high level signal no matter which one of the voltages Va and Vb is selected. Thus, the rotation of the motor M is not interrupted by break-effect circuit 62d. The direction or rotation of the motor M is determined by the signal level produced from the switching circuit 62a, i.e, by the voltage selected by the selector 63c, and the lens 8 is to be shifted in a direction towards proper focus position by the shifting force transmitted from the motor M through the gears 14 and 8b to the lens 8. Under the above condition, the rotation of motor M begins when the power supplier 62e receives a high level signal from the flip-flop 61 and feeds the motor M with the power.

In response to the lens shift effected by the motor M, the pulse generator PG in the lens-shift detector 64 produces a train of pulses, and the counter therein counts up the generated pulses. When the counted number matches the signal from the memory 56a, the comparator 63a produces a low level signal, and accordingly, the switching circuit 63b is de-actuated. Thus, the selector 63c produces a zero level signal which is applied to the switching circuits 62a and 62b. The switching circuit 62b then produces a low level signal for shortcircuiting the motor M. Thereupon, the motor stops to locate the lens 8 in proper focus position. When the motor M is shortcircuited, the inverter 62f produces a high level signal which is applied through an OR gate 65 to flip-flop 61 for resetting the flip-flop 61. When the flip-flop 61 is reset, the power supplier 62e supplies no further power to the motor M.

It is noted that the high level signal produced from the inverter 62f can be considered as a signal which indicates the accomplishment of the proper focusing, and thus it is referred to as a focus completion signal.

It is also to be noted that the counter provided in the lens-shift detector 64 can be reset to zero by the high level signal produced from the inverter 62f, or a signal produced upon turning of the switch S9 at the moment of the termination of the exposure, or a signal produced upon turning of the switch S10 at the downward movement of the mirror 9, or the start signal produced from the flip-flop 51, or by any other suitable signal.

Thereafter, the motor is maintained de-actuated, and the lens 8 is maintained still, until the power supplier 62e is again turned active by the high level signal from the flip-flop 61.

Referring back to FIG. 3, the focus completion signal produced from the auto-focus actuator 62 is also applied to one input of an AND gate 66 as a trigger signal for actuating a release circuit 71 in the next step of operation. The other input of the AND gate 66 is supplied with a high level signal from a high level singal producing circuit 106 through a switch S5, which has been turned on at the moment T1. Thus, the focus completion signal passes through the AND gate 66 and also through an OR gate 67, and is applied to set terminal S of a flip-flop 68. When the flip-flop 68 receives the focus completion signal, it produces a high level signal from its Q-terminal which is connected to one input of an AND gate 69. The other input of the AND gate 69 is connected to the $\bar{Q}$-terminal of a flip-flop 70, from which a high level signal is produced upon completion of shutter charge and film winding-up operation. More particularly, the reset terminal R of the flip-flop 70 is connected to a charge-completion-detection circuit 72 which detects the completion of shutter charge and film winding-up operation, and produces a high level signal to the reset terminal R of the flip-flop 70. Since the shutter charge and film winding-up operation has been completed before, the $\bar{Q}$-terminal of the flip-flop 70 produces a high level signal permitting the transmital of the high level signal from the Q-terminal of the flip-flop 68 through the AND gate 69 to the release circuit 71.

When the release circuit 71 receives a high level signal, a shutter release operation is carried out in the following steps. At a moment T3 (FIG. 3), the reflex mirror 9 flips up together with the auxiliary mirror 10 by the actuator 15 for directing light rays towards the film surface, and at the same time, the arm 15a extending from the actuator 15 stops depressing the diaphragm control lever 8b to shift the control level 8b to a preset position. Thereafter a leading curtain of the shutter mechanism 16 is scanned for allowing exposure of the light rays on the film surface 21. And then, at a moment T4 (FIG. 3), the trailing curtain follows the leading curtain to complete the exposure.

The switch S9 is provided operatively in association with the trailing curtain such that it turns from on to off just before the trailing curtain completes its scan. When the switch S9 opens, a positive going pulse is produced from a capacitor C5 for setting the flip-flop 70. Thus, the Q-terminal of the flip-flop 70 produces a low level signal, and at the same time the Q-terminal of the same produces a high level signal. The high level signal produced from the Q-terminal of the flip-flop 70 is applied to a charge circuit 73 which thereupon actuates the charge motor 18 mounted in the spool 17 for charging the shutter mechanism by way of link mechanism 19 and also for winding the film by way of winding mechanism 20. The actuation of the line mechanism causes the flip down, or returning, of the mirror 9 back to the position shown in FIG. 2 against biasing force, and also fully opens the diaphragm against biasing force. The flip down of the mirror 9 is effected at a moment T5 shown in FIG. 5.

The positive going pulse produced from the capacitor C5 is also applied through an OR gate 76 to each of the flip-flop circuits 51, 58, 61 and 68 to reset these flip-flops. According to the above operation, the flip-flop 58 has already been reset before the first frame advance, and the flip-flop 61 has been reset by the focus completion signal. As understood from the foregoing description, the charge circuit 73 operates independently of depression and release of the shutter button 3, but dependently on the pulse signal produced from the capacitor C5 in response to the opening of the switch S9.

The charge completion circuit 72 detects that the spool 22 has been rotated a required amount for effecting the film advance of 1 frame, and at the same time, it detects that the mirror 9 and diaphragm have been returned to their initial position against biasing force, and thereupon, the charge completion circuit 72 produces a high level signal which is applied to the flip-flop 70 which is then reset to produce a low level signal from its Q-terminal. Accordingly, the charge circuit 73 is de-actuated.

This is the end of photographing operation of the first frame in the second submode of the frame-advance-speed preferred successive photographing mode v. The description below is directed to the second and subsequent photographing operations in the second submode of the mode v.

The photographing operation of the second frame is initiated by a trigger signal obtained upon flip down of the mirror 9. When the mirror 9 flips down, the switch S10, which has been in the on condition, turns off at the very beginning of flip down motion of the mirror 9, i.e., at the moment T5. Upon opening of the switch S10, the capacitor C1 produces a positive going trigger pulse which is applied through an OR gate 50 and switches S12 and S4, which have been turned on, to a set terminal of the flip-flop 51 for setting the flip-flop 51 again to produce a high level signal (start signal) from its Q-terminal. The start signal is applied to the control circuit 52 to start the distance measuring operation by the distance measuring circuit 54 and its associated circuits, in a similar manner described above.

The trigger pulse produced by the capacitor C1 is also applied through the switch S3, which has been held closed during the depression of shutter button 3, to the set terminal of the flip-flop 58, which thereupon is set to produce a high level signal from its Q-terminal. The high level signal produced from the Q-terminal of the flip-flop 58 is applied through the switch S15 to the level detector 59 which then determines whether the signal obtained from the switch S2 is above or below the predetermined level Lx. In the second submode, the switch S2 is connected to the terminal b, and accordingly, the level detector 59 detects whether the brightness signal obtained from the light measuring circuit 53 is above or below the predetermined level Lx.

If the brightness signal is above the level Lx, that is, the object to be photographed is sufficiently bright to carry out the distance measuring operation within a predetermined period of time, the level detector 59 produces and supplies a high level signal to the AND gate 60 to complete the auto-focusing operation in a similar manner described above.

However, if the brightness signal is below the predetermined level Lx, that is, the object to be photographed is not bright enough to carry out the distance measuring operation within said predetermined period of time, the level detector 59 produces and supplies a low level signal to the AND gate 60. In this case, the AND gate 60 produces a low level signal to render the AND gate 57 in the de-actuated condition. Thus, the AND gate 57 prevents the distance-measuring-completion signal from being transferred from the calculation circuit 56 to the set terminal of the flip-flop 61. Therefore, in this case, the auto-focus actuator 62 is maintained non-actuated, and thus, the lens 8 is maintained in the position previously set. The low level signal produced from the AND gate 60 is inverted by an inverter 74 to a high level signal which is applied to one of three inputs of an AND gate 75. The other two inputs of the AND gate 75 receive a high level signal from the circuit 106 through switch S5 and from the inverter 80. Thus, the AND gate 75 produces a high level signal which is applied through the OR gate 67 to the set terminal of the flip-flop 68. Then, the flip-flop 68 produces a high level signal to actuate the release circuit 71 to complete the photographing of the second frame.

As is apparent from the foregoing description, under the second submode operation in the mode v, the flip-flop 58 produces a low level signal from its Q-terminal during the photographing operation of the first frame and a high level signal during the second and subsequent photographing operations. Thus, no matter how long it takes, the auto-focusing operation for the first frame is carried out without failure. For the second and subsequent photographing operations, the auto-focusing operation is carried out if it can be carried out within a predetermined time.

Next, the first submode is selected by turning the dial 5 to change the position of the switch S15 from the position shown in FIG. 3 or 6 to the position in which its arm is connected to the circuit 83, which constantly produces a high level signal. Under the first submode operation, the level detector 59 receives a high level signal through the switch S15 from the very beginning of the operation. Thus, in the first submode, the level detector 59 detects whether the signal level from the switch S2 is above or below the predetermined level Lx from the first frame. Accordingly, the first frame can be photographed within a predetermined time, with the auto-focusing operation being carried out if it can be done within said predetermined time.

The third submode in the mode v is obtained, as shown in the table of FIG. 4, when the dial 5 is so turned as to connect the arm of the switch S2 with a terminal c which is connected to a circuit 103 designed for producing a low level signal.

In the third submode, the photographing operation for the first frame is carried out in such steps that the flip-flop 58, which is initially in the reset condition, produces a low level signal from its Q-terminal, thus the level detector 59 supplies a high level signal to the AND GATE 60 regardless of the level of the signal from the switch S2. Thus, the first frame is photographed with auto-focusing operation without any failure. Upon completion of the first photographing, the flip-flop 58 is, and accordingly, the Q-terminal of the flip-flop 58 produces a high level signal thereafter. Thus, in the second and subsequent photographing operations, the level detector 59 detects that the signal from the switch S2, which is connected to the terminal c, is below the predetermined level Lx, and thus supplies a low level signal to the AND gate 60. Thus, in the third submode, the photographing of the first frame is carried out with auto-focusing operation without any failure, and the second and subsequent photographing operations are carried out without any auto-focusing operation. In other words, the second and subsequent photographing operations are carried out with the picture-taking lens 8 being maintained in the position set in the first photographing operation.

When the shutter button 3 is released from the depression in either of the first, second or third submode, and when it rises up half way at a moment T6, the switch S7 turns from off to on, and when it rises up all the way at a moment T7, the switches S3, S4, S5, S6 and S11 turns from on to off, simultaneously. By the opening of the switch S6, a capacitor C6 connected thereto produces a positive going pulse which is applied through the OR gate 76 to a reset terminal of each of the flip-flops 51, 58 and 68 to reset the same, and also to a reset terminal of the flip-flop 61 through an OR gate 65. Thus, the circuit shown in FIG. 3 returns to the initial condition.

According to the first embodiment shown in FIG. 3, the light measuring circuit 53 is also connected with a display circuit 77 which, upon receipt of voltage or current from the light measuring circuit 53, may display a time interval from the depression of shutter button 3 to the shutter release operation, or a time necessary to carry out the auto-focusing operation, or may give out a sign indicating that the lens position in the photographing operation now being carried out is based on the auto-focus operation carried out in the previous photographing. The display circuit 77 includes any known indicators, such as segment indicators, light emitting diodes or liquid crystals, and may be so arranged as to be viewable through the viewfinder.

(iv) Auto-focus Preferred Successive Photographing Mode

When the mode selection dial 5 is so turned as to select the auto-focus preferred successive photographing mode iv, the switches S1, S8, S12 and S13 are turned on, the switch S2 is so turned as to connect its arm with a terminal a, and the switch S15 is so turned as to conect its arm with the flip-flop 58, as shown in the table of FIG. 4. The terminal a of the switch S2 is connected to a circuit 79 which constantly produces a high level signal. In the initial condition, the flip-flop 58 is in a reset condition, and thus, it supplied a low level signal to the level detector 59. In this case, the level detector 59 provides a high level signal to the AND gate 60 regardless of the level of the signal from the switch S2. Thus, the first frame is photographed with auto-focusing operation no matter how long it takes to measure the distance to the object to be photographed.

When the photographing of the first frame is completed, the flip-flop 58 is set by the turning off of the switch S10, and accordingly, the level detector 59 receives a high level signal from the switch S15. In this case, the level detector 59 detects that the signal from the switch S2 is above the predetermined level Lx, and accordingly, in the second and subsequent photographing operations, the level detector 59 continues to supply a high level signal to the AND gate 60, which in turn produces a high level signal. The high level signal produced from the AND gate 60 permits the auto-focusing operation in a similar manner described above. Furthermore, the high level signal from the AND gate 60 is inverted to a low level signal by the inverter 74, and such an inverted low level signal prevents the AND gate 75 from transmitting any signal. Therefore, in the mode iv, the auto-focusing operation is carried out in each of the successive photographing operations without any failure, and the flip-flop 68 is always set by the signal obtained not from the AND gate 75, but from the AND gate 66. It is to be noted that the flip-flop 70, charge completion circuit 72 and charge circuit 73 operate in the same manner as described in the previous mode v.

(iii) Successive Photographing Mode

When the successive photographing mode iii is selected by the dial 5, the switches S1 and S13 close and the switches S8 and S12 open, as shown in the table of FIG. 4. Furthermore, the switch S2 is so turned as to connect its arm with the terminal a, and the switch S15 is so turned as to connect it arm with the flip-flop 58. Since the switch S8 is maintained open in this mode iii, the AND gate 60 always produces a low level signal regardless of what signal is being applied thereto from the level detector 59. Thus, the auto-focus actuator 62 is maintained in de-actuated condition. Furthermore, since the switch S12 is maintained open in this mode iii, no start signal will be applied to the distance measuring circuit 54.

According to this mode, the AND gate 75 receives a high level signal from each of the inverters 80 and 74, and furthermore, it receives a high level signal from the circuit 106 when the switch S5 closes in response to the depression of the shutter button 3 half way (at the moment T1 shown in FIG. 5). Thus, in this mode, the flip-flop 68 is set in response to the depression of shutter button 3 half way. Since the shutter mechanism has been already in the charged condition, the high level signal produced from the flip-flop 68 actuates the release circuit 71, causing the shutter release operation in a similar manner described above. This completes the photographing operation for the first frame. The second photographing operation is initiated by the flip-down movement of the mirror 9 which then actuates the switch S10 for setting the flip-flop 68 again. Thereafter, when the charge-completion-detection circuit 72 produces a high level signal in response to the completion of the shutter charge and film winding-up operation, the flip-flop 70 produces a high level signal through the OR gate 69 to the release circuit 71 for completing the second photographing operation. A similar operation is repeated until the shutter button 3 is released from being depressed.

(ii) Auto-focus Single Photographing Mode

When the mode selection dial 5 is so turned as to select the auto-focus single photographing mode ii, the switches S1 and S13 open, and the switches S8 and S12 close, as shown in FIG. 4. Furthermore, the switch S2 is so turned as to connect its arm with the terminal a, and the switch S15 is so turned as to connect its arm with the flip-flop 58. Since the switches S1 and S13 are turned off, the pulse produced in response to the closure of the switch S10 at the flip down of the mirror 9, i.e., at the moment T5 in FIG. 5, will not be applied to the OR gate 50 or to the inverter 80. Thus, the OR gate 50 receives a pulse only when the switch S7 opens in response to the depression of the shutter button 3 all the way, i.e., at the moment T2. This means that the auto-focusing operation is carried out only when the shutter button 3 is depressed. Furthermore, in the mode ii, the AND gate 60 always produces a high level signal, and thus, the AND gate 75 continues to produces a low level signal. When the flop-flop 68 is set by the high level signal obtained from the AND gate 66, the release circuit 71 is actuated to release the shutter mechanism. When one photographing operation is completed in the auto-focus mode, the OR gate 76 produces a high level signal in the above described manner to reset the flip-flops 68, 61, 58, and 51, making the circuit ready for the next photographing operation. However, in the mode ii, since the switch S1 is turned off, no further pulse will be applied to the set terminal of the flip-flop 51. Thus, the flip-flop 51 is maintained in the reset condition to prevent any further photographing operations. Therefore, even if the flip-flop 70 produces a high level signal from its $\bar{Q}$-terminal in response to the completion of shutter charge and film winding-up operation, the AND gate 69 continues to produce a low level signal to allow only one photographing operation in the mode ii.

(i) Single Photographing Mode

When the mode selection dial 5 is so turned as to select the single photographing mode i, the switches S1, S8, S12 and S13 open, as indicated in FIG. 4. Furthermore, the switch S2 is so turned as to connect its arm with the terminal a, and the switch S15 is so turned as to connect its arm with the flip-flop 58. Since the switch S12 is off, no auto-focus operation is carried out. In response to the depression of the shutter button 3, the switch S5 closes to produce a high level signal from the AND gate 75. The high level signal from the AND gate 75 sets the flip-flop 68, and accordingly, the release circuit 71 is actuated to release the shutter mechanism. This completes one photographing operation without auto-focus. Thereafter, since the switch S13 is off, the flip-flop 68 is maintained in the reset condition, preventing any further photographing operations.

Second Embodiment

Figure 8:
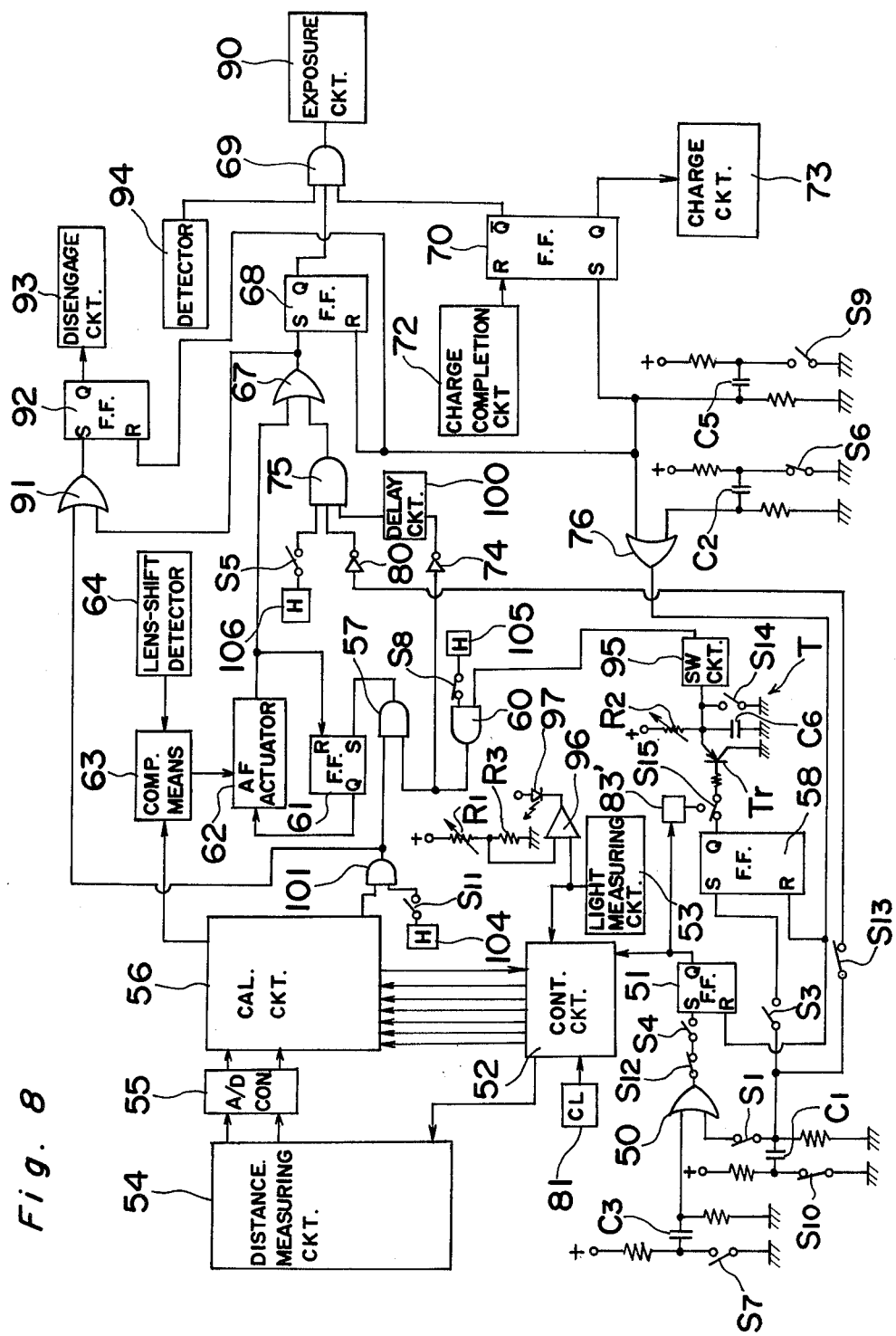
FIG. 8 is a circuit diagram of a logic circuit employed in a camera, according to a second embodiment of the present invention.

Referring to FIG. 8, there is shown a logic circuit according to the second embodiment of the present invention. It is to be noted that the logic circuit according to the second embodiment is provided operatively in association with the camera shown in FIGS. 1 and 2. Since the circuit of the second embodiment is similar to that of the first embodiment, the difference therebetween is mainly explained.

Instead of the display circuit 77, the circuit according to the second embodiment includes a comparator 96 having one input connected to the light measuring circuit 53 and the other input connected to a junction between a variable resistor R1 and resistor R3 which are connected in series between constant power source and ground. Thus, by changing the variable resistor R1, a desired reference voltage can be applied to said one input of the comparator 96. The variable resistor R1 can be changed by the operator's will or automatically by the camera in relation to the set frame advance speed. The output of the comparator 96 is connected to a light emitting diode 97 which can be viewable through the viewfinder. When the voltage level produced from the light measuring circuit falls below the reference level determined by the resistors R1 and R3, the comparator 96 produces a high level signal for actuating the light emitting diode 97, which then produces a warning signal indicating that the object to be photographed is too dark to carry out the auto-focusing operation within a preselected time. From such a warning signal, the operator may judge whether the photographing operation should be stopped or not.

By the employment of the above arrangement, it is possible to avoid any auto-focusing operations which take such an unexpectedly long time as would force the operator to loose a shutter chance.

Furthermore, the circuit according to the second embodiment is so designed as to shorten the time necessary to carry out the auto-focusing operations, as described below.

The output of the calculation circuit 56, from which the distance-measuring-completion signal is produced, is connected to one input of an AND gate 101. The other input of the AND gate 101 is connected to the high level producing circuit 104 through the switch S11. The output of the AND gate 101 is connected through an OR gate 91 to the set terminal of a flip-flop 92. The Q-terminal of the flip-flop 92 is connected to a disengage circuit 93 which, upon receipt of a high level signal from the flip-flop 92, disengages an arm (not shown) that holds mirror 9 in the flipped down position and the lever 15a that holds the diaphragm in the fully opened condition. Thus, when the disengage circuit 93 is actuated, the mirror 9 flips up to allow light rays towards the film and, at the same time, the diaphragm is reduced to a required size. In other words, the mirror 9 and the diaphragm are brought to their stand-by position, ready for taking a photograph. A detector 94 is provided operatively in association with the disengage circuit 93 to detect the completion of flip up of the mirror 9 and the reduction of diaphragm size, and also to produce a high level signal (shift-completion signal) upon detection of the same. The shift-completion signal is applied to one of three inputs of the AND gate 69. The other two inputs of the AND gate 69 are connected with the Q-terminal of the flip-flop 68 and $\bar{Q}$-terminal of the flip-flop 70, respectively. By such an arrangement, it is not necessary to provide the AND gate 66 and OR gate 65 provided in the first embodiment.

Furthermore, according to the second embodiment, the reset terminal R of the flip-flop 92 is connected to the capacitor C5, which produces a high level signal upon opening of the switch S9 effected when the trailing curtain completes its scan.

According to the circuit arrangement described above, the distance-measuring-completion signal produced from the calculation circuit 56 is used not only for actuating the auto-focus actuator 62 but also for turning the mirror 9 and the diaphragm to their stand-by position. Therefore, the auto-focus operation and the shift operation of the mirror 9 and the diaphragm to their stand-by position can be carried out approximately at the same time in response to the distance-measuring-completion signal.

The AND gate 69 is connected to an exposure circuit 90 which opens the shutter upon receipt of a high level signal from the AND gate 69. In other words, according to the second embodiment, the high level signal produced from the AND gate 69 effects, e.g., only the scan of the leading and trailing curtains, whereas according to the first embodiment, the high level signal produced from the AND gate 69 effects the movement of mirror 9 and diaphragm to their stand-by position and also the scan of the leading and trailing curtains.

As is apparent from the foregoing description, the logic circuit according to the second embodiment shortens the time for completing one photographic operation.

It is to be noted that, according to the first embodiment, the auto-focus actuator 62 stops its operation in response to the release of shutter button 3 by the pulse produced from OR gate 76, and accordingly, the auto-focusing operation stops immediately. However, according to the second embodiment, the pulse produced from the OR gate 76 is not applied to the reset terminal of the flip-flop 61. Thus, the auto-focus actuator 62 immediately stops its operation in response to the release of shutter button 3 only when such a release is effected before the calculation circuit 56 produces the completion signal, because the release of the shutter button 3 opens the switch 11 to prevent the transmittal of the completion signal through the AND gate 101 to the flip-flop 61. If, in the second embodiment, the release of shutter button 3 is effected after the calculation circuit 56 produces the completion signal, the completion signal from the calculation circuit 56 will be passed onto the flip-flop 61 for completing the photographing operation which is now being carried out. And then the photographing operation stops. In other words, when the shutter button 3 is released, the photographing operation (excluding the charging operation) stops after the completion of the photographing operation now being carried out.

The second embodiment further includes a timer circuit T and its related circuits. The timer circuit T comprises a variable resistor R2 and a capacitor C6 connected in series between constant power source and ground. A switch S14 is connected parallelly to the capacitor C6. A junction between the resistor R2 and the capacitor C6 is connected to a emitter of an NPN transistor Tr having its collector connected to ground. The base of the transistor Tr is connected through a suitable resistor to an arm of a switch S15. The junction is further connected to a switching circuit 95 which produces a low level signal when the input signal thereto exceeds a predetermined level. The output of the switching circuit 95 is connected to the AND gate 60.

It is to be noted that according to the second embodiment, the output of the AND gate 60 is applied to the AND gate 75 through a suitable delay circuit 100, and in the embodiment shown in FIG. 8, such a delay circuit 100 is connected between the inverter 74 and the AND gate 75. The delay circuit 100 delays the transmission of signal from the inverter 74 to the AND gate 75 by a predetermined time which is substantially equal to the maximum time required for the auto-focus actuator 62 to carry out the auto-focusing operation.

Furthermore, according to the second embodiment, the high level signal producing circuit 83' produces the high level signal only when it receives a high level signal (start signal) from the Q-terminal of the flip-flop 51. The arm of the switch S15 is selectably connectable to the output of the high level signal producing circuit 83' or to the Q-terminal of the flip-flop 58.

In the timer circuit T, the variable resistor R2 is connected for changing the time set by the timer circuit T. Also, the switches S14 and S15 are connected operatively to the mode selection dial 5. According to the second embodiment, the mode ii has two submodes, and the mode v has two submodes, as shown in FIG. 9. When the switch S14 is turned on to de-actuate the timer circuit T, the auto-focusing operation is preferred as in the mode i, the second submode in mode ii, mode iii or mode iv, as is apparent from FIG. 9, and when the switch S14 is turned off to actuate the timer circuit T, the frame advance speed is preferred as in the first submode in mode ii, and the first and second submodes in mode v. The purpose for employing such a timer circuit T is to effect the shutter release and frame advance after the time interval set by the timer circuit T regardless of whether the auto-focus actuator 62 has completed its auto focusing operation or not.

Next, the operation of the second embodiment is described under the modes v and ii.

(v) Frame-Advance-Speed Preferred Successive Photographing Mode

When the dial 5 is turned to turn the switches S1, S8, S12 and S13 on, and the switch S14 off and connect the arm of the switch S15 to the flip-flop 58, as indicated in FIG. 9, the second submode in mode v is selected. When the second submode in mode v is selected, the photographing operation is carried out by the following steps. Since the flip-flop 58 is producing a low level signal from its Q-terminal before completing the photographing operation of the first frame, the transistor Tr conducts to de-actuate the timer circuit T, and accordingly, the switching circuit 95 produces a high level signal for carrying out the auto-focusing operation by the auto-focus actuator 62 no matter how long it takes to complete the auto-focusing operation. And then, the shutter release for the first frame is completed by the exposure circuit 90 in a manner described above. Thereafter, in response to the flip down of the mirror 9, the OR gate 76 produces a high level signal for resetting the flip-flop 58, and accordingly, the Q-terminal of the flip-flop 58 produces a high level signal which turns the transistor Tr to non-conductive state. Thus, the capacitor C6 starts to charge by the current determined by the variable resistor R2. When the capacitor C6 is charged to a predetermined level, that is, when the timer circuit T has counted a predetermined time period Tx determined by the time constant of the capacitor C6 and the variable resistor R2, the switch circuit 95, which has been producing a high level signal, produces a low level signal. Such a low level signal from the switching circuit 95 is applied through the AND gate 60 to the AND gate 57 for preventing the transmission of completion signal through the AND gate 57 from the AND gate 101 to the set terminal of the flip-flop 61.

If the subject to be photographed is brighter than a predetermined brightness, the calculation circuit 56 produces the completion signal within the time period Tx, and accordingly, the completion signal can be transmitted through the AND gate 57 to the flip-flop 61. Thus, in this case, the auto-focus actuator 62 is actuated to carry out the auto-focusing operation.

However, if the subject to be photographed is less brighter than the predetermined brightness, the calculation circuit 56 produces the completion signal after the time period Tx, and accordingly, the completion signal is blocked at the AND gate 57. In this case, no auto focusing operation is carried out, and also the light emitting diode 97 is actuated to produce a visual warning signal. Furthermore, in this case, the low level signal produced from the switching circuit 95 is applied through the AND gate 60 to the inverter 74, which then produces a high level signal. The high level signal from the inverter 74 is applied to the delay circuit 100 and in turn to one input of the AND gate 75. The AND gate 75 then produces a high level signal which is applied through OR gate 67 to the OR gate 91 and also to the flip-flop 68. The high level signal applied to the OR gate 91 is further applied to flip-flop 92 which then produces a high level signal from its Q-terminal for actuating the disengage circuit 93. Thus, the mirror 9 and the diaphragm are set to their stand-by position. The high level signal applied to the flip-flop 68 turns the flip-flop 68 to the set condition for producing a high level signal from its Q-terminal. The high level signal produced from the Q-terminal is applied through the AND gate 69 to the exposure circuit 90 for effecting the exposure operation in a manner described above.

As understood from the foregoing description, the successive photographing operations under the second submode in mode v is carried out with the auto-focusing operation carried out without failure for the first frame and, for the second and successive photographing operations, with a predetermined frame advance speed and with auto-focusing operation in each shutter release if it can be done within the predetermined time period Tx.

When the dial 5 is turned to connect the arm of the switch S15 to the high level producing circuit 83' and to turn the switches S1, S8, S12 and S13 on and the switch S14 off (FIG. 9), the first submode in mode v is selected. In the first submode, the high level signal producing circuit 83' starts to produce a high level signal when the flip-flop 51 starts to produce a high level signal (start signal), i.e., when the switch S7 opens upon depression of shutter button 3 at the momemt T2 (FIG. 5). When the circuit 83' produces the high level signal, the transistor Tr is turned to the non-conductive state for actuating the timer circuit T. Thus, the successive photographing operations under the first submode is carried out with a predetermined frame advance speed from the first frame, and with an auto-focusing operation carried out in each photographing operation if it can be done within a predetermined time Tx.

(ii) Auto-Focus Single Photographing Mode

When the dial 5 is turned to turn the switches S8 and S12 on, switches S1, S13 and S14 off and to connect the arm of the switch S15 to the high level producing circuit 83', as indicated in FIG. 9, the first submode in mode ii is selected. When this submode is selected, the timer circuit T is actuated to effect the single photographing operation within a predetermined period of time with auto-focusing operation carried out only when it can be done within set period of time Tx.

On the other hand, when the dial 5 is turned to turn the switches S8, S12 and S14 on and S1 and S13 off, and to connect the arm of the switch S15 to the flip-flop 58, the second submode in mode ii is selected. When this submode is selected, the timer circuit T is de-actuated, and accordingly, switching circuit 95 maintained to produce only a high level signal. Thus, in this submode, the auto-focusing operation is carried out without failure, no matter how long it takes to complete the auto-focusing operation.

Third Embodiment

Figure 10:
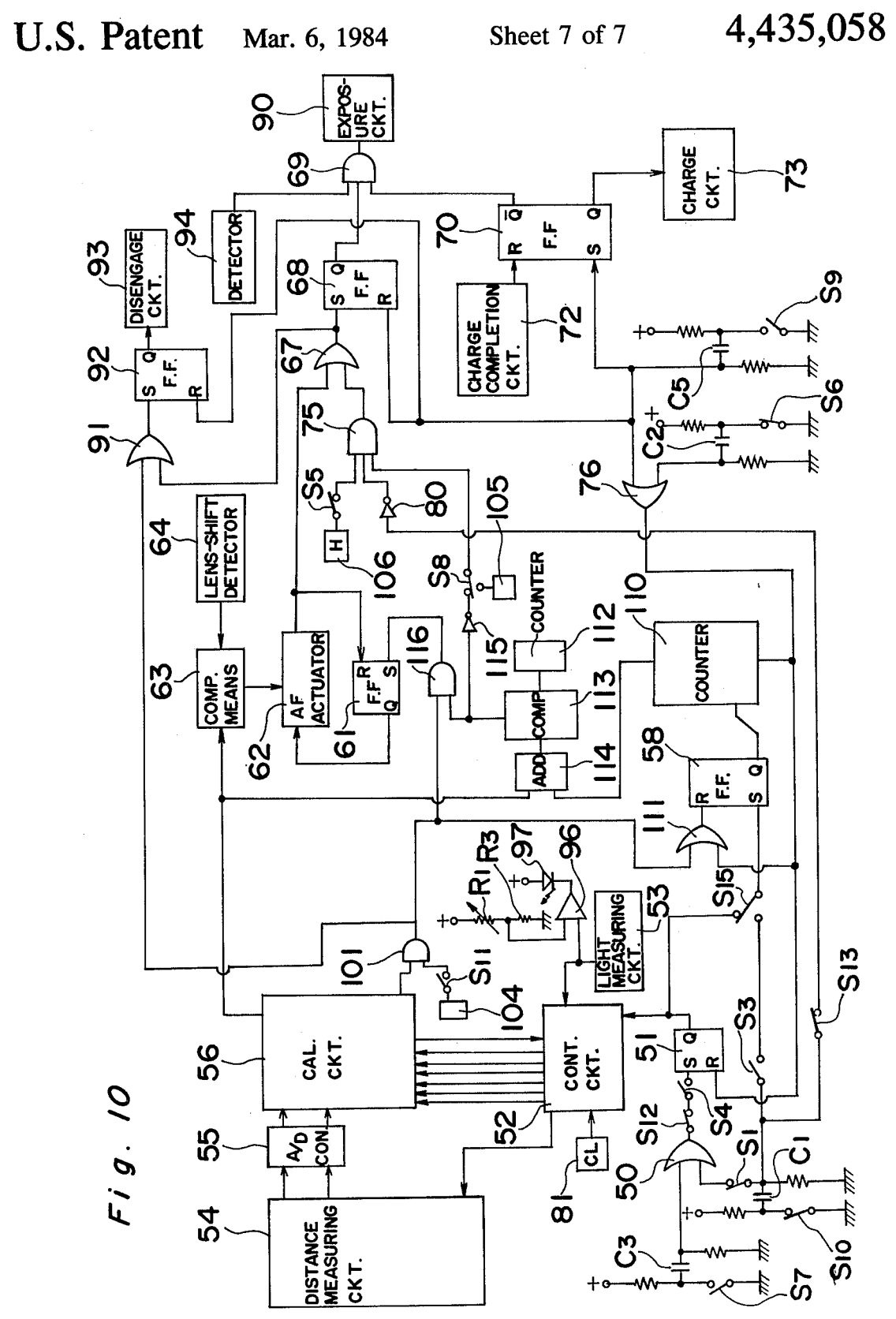

Referring to FIG. 10, there is shown a logic circuit according to the third embodiment of the present invention. The logic circuit of the third embodiment is provided operatively in association with the camera shown in FIGS. 1 and 2. Since the logic circuit of the third embodiment is similar to that of the second embodiment, the description below is given in comparison with the second embodiment.

According to the second embodiment described above in connection with FIG. 8, the auto-focusing operation under the frame advance speed preferred mode, such as in mode v, is carried out only when the calculation circuit 56 produces the completion signal within the set time Tx. In other words, the time necessary for the calculation circuit 56 to produce the completion signal is compared with the set time Tx.

Whereas according to the third embodiment described below, the auto-focusing operation under the frame advance speed preferred mode is carried out only when a sum of time necessary for the calculation circuit 56 to produce the completion signal and the time necessary for the auto-focus actuator 62 to complete the auto-focusing operation falls within a set time Tx'.

According to the third embodiment, the flip-flop 58 has its set terminal connected the switch S15, and its reset terminal is connected to an output of an OR gate 111. One input of the OR gate 111 is connected to the AND gate 101 and the other input thereof is connected to the output of the OR gate 76. The Q-terminal of the flip-flop 58 is connected to a counter 110 which starts to count-up upon receipt of a high level signal from the flip-flop 58. The output of the counter 110 carrying the counted number is connected to one input of an adder 114. The other input of the adder 114 is connected to the output of the calculation circuit 56 from which the signal representing the degree of out of focus is produced. The output of the adder 114 is connected to a comparator 113 which compares the signal from the adder 114 with a reference signal obtained from a counter 112. The output of the comparator 113 is connected through an AND gate 116 to the set terminal of the flip-flop 61 and also to an inverter 115. The input of the AND gate 116 is also connected to the output of the AND gate 101. The inverter 115 is connected through the switch S8 to the input of the AND gate 75. The switch S8 is provided for selectively connecting the input of the AND gate 75 with the inverter 115 or a circuit 105 which produces a high level signal.

Next, the operation of the logic circuit according to the third embodiment is described.

When the flip-flop 51 produces the start signal from its Q-terminal, the start signal is applied to the control circuit 52 for carrying out the distance measuring and the detection of degree of out of focus in the circuits 54, 55 and 56 in a manner described above, and at the same time, the start signal is also applied to the flip-flop 58 for starting the counter 110. Thereafter, when the calculation circuit 56 completes calculation and memorizes the calculated result, it produces the completion signal which is applied through the AND gate 101 and OR gate 111 to reset terminal of the flip-flop 58. Thus, the Q-terminal of the flip-flop 58 now produces a low level signal for stopping the counter 110. Accordingly, the counter 110 has counted time necessary for the circuits 54, 55 and 56 to complete distance measuring and detection of degree of out of focus.

During the counter 110 counting the time, its output is incessantly applied to the adder 114 which adds the counted time with an output signal representing the degree of out of focus from the calculation circuit 56. Since no output signal representing the degree of out of focus is being produced during the counter 110 counting the time, the adder 114 only produces the counted time during this moment. Then, in the comparator 113, the counted time is compared with a reference level Tx' set by the counter 112. If the counted time remains below the reference level Tx', the comparator 113 continues to produce a high level signal. If, on the other hand, the counted time exceeds the reference level Tx', the comparator 113, which has been producing a high level signal, produces a low level signal for de-actuating the AND gate 116, and at the same time, for actuating the AND gate 75. Thus, in the latter, the photographing operation is carried out without auto-focus operation, because the calculation circuit 56 failed to produce the completion signal before the counter 110 counting up to the reference level Tx'.

In the former, i.e., when the calculation circuit 56 produces the completion signal before the counter 110 counts up to the reference level Tx', the counted time from the counter 110 is added with the signal representing the degree of out of focus, which has been produced in response to the completion of counting in the counter 110.

If the added sum is below the reference level Tx', the comparator 113 continues to produce a high level signal for maintaining the AND gate 116 actuated and permitting the transmission of completion signal from the calculation circuit 56 to the flip-flop 61. Thus, in this case, the photographing operation is carried out with auto-focusing operation.

If, on the other hand, the added sum exceeds the reference level Tx', the comparator 113 produces a low level signal for effecting the photographing operation without auto-focusing, in a manner described above.

It is to be noted that the counter 110 is reset by a pulse produced from the OR gate 76 in response to the turning of the switch S6 or S9.

It is also to be noted that the logic circuit according to the third embodiment of the present invention operates in different modes as described in the second embodiment.

As has been described above, the auto-focus control camera according to the present invention can carry out the auto-focus operation only when such an auto-focus operation can be done within a predetermined period of time. In other words, in the case where the subject to be photographed is brighter than a required brightness, the distance measuring operation and the calculation of degree of out of focus are carried out within a predetermined period of time, and in this case, the auto-focus operation is carried out without failure. However, in the case where the subject to be photographed is less brighter than the required brightness, the logic circuit in the camera automatically detects that the distance measuring and calculation operations take a period of time longer than the predetermined period of time, and in this case, the photographing operation is carried out without the auto-focus. Thus, in this case, the camera's picture taking lens is maintained in the position obtained in the previous auto-focus operation. Thus, the photographing operation can be carried out within a set period of time, allowing the photographer to catch the desired shutter chance.

Furthermore, according to the present invention, it is possible to forcibly carry out the auto-focus operation no matter how long it takes. Particularly in the successive photographing modes, such a forcible auto-focus operation can be carried out not only in photographing operations for all the frames but also only in the first frame.

Moreover, according to the present invention, a display circuit is provided for producing a warning signal indicating that the subject to be photographed is less brighter than the required brightness. In this case, the operator is informed that the distance measuring and calculation operations will take a long time, and thus, he can simply judge and select a mode which meets his requirement.

Although the present invention has been fully described with reference to several preferred embodiments, many modifications and variations thereof will now be apparent to those skilled in the art, and the scope of the present invention is therefore to be limited not by the details of the preferred embodiments described above, but by the terms of appended claims.

What is claimed is:

1. Auto-focus control camera comprising:
   means for photoelectrically obtaining information for auto-focus adjustment, said obtaining means being of a type in which the time taken to complete the information depends on the scene brightness;
   means for adjusting the focus of the camera in accordance with said information;
   means for effecting the film winding-up operation;
   means for detecting that the time taken for said obtaining means to complete the information is greater than a predetermined period, to disable the focus adjustment by said adjusting means; and
   means for causing the camera exposure in response to the completion of the focus adjustment and the completion of the film winding-up operation when the time greater than the predetermined period is not detected by said detecting means, and in response to the detection by said detecting means and the completion of the film winding-up operation when the time greater than the predetermined period is detected by said detecting means.

2. Auto-focus control camera according to claim 1, wherein said detecting means includes means for measuring a scene brightness and means for comparing the measured scene brightness with a predetermined level, whereby the time greater than the predetermined period is detected through the detection of the scene brightness less than the predetermined level by said comparing means.

3. Auto-focus control camera according to claim 2, wherein said detecting means further includes means for variably setting the predetermined level.

4. Auto-focus control camera according to claim 2, further comprising means for indicating information relating to the time taken for said obtaining means to complete the information, in response to the operation of said measuring means.

5. Auto-focus control camera according to claim 1, wherein said detecting means includes means for counting the predetermined period in synchronism with the operation of said obtaining means, whereby the time greater than the predetermined period is detected when the completion of the counting of the predetermined period by said counting means is prior to the completion of the information by said obtaining means.

6. Auto-focus control camera according to claim 1, further comprising means for initiating the photographing operation, means for automatically instructing said effecting means to effect the film winding-up operation in response to the termination of a preceding camera exposure with said initiating means maintained in a condition to continue the photographing operation, whereby a plurality of exposures are successively carried out as long as said initiating means is maintained in said condition.

7. Auto-focus control camera according to claim 6, further comprising means for excluding the function of said detecting means from the camera operation with respect to only the first exposure in response to the operation of said initiating means.

8. Auto-focus control camera according to claim 1, further comprising means for warning that the focus adjustment by said adjusting means is disabled by said detecting means.

9. Auto-focus control camera according to claim 1, wherein said adjusting means includes means for monitoring the degree of actual focus adjustment and means for completing the focus adjustment when the monitored degree coincides with the information from said obtaining means.

10. Auto-focus control camera according to claim 1, wherein said detecting means includes means for variably setting a value for defining the predetermined period.

11. Auto-focus control camera according to claim 1, further comprising means for automatically instructing said effecting means to effect the film winding-up operation in response to the termination of the camera exposure so that a plurality of exposures are successively carried out, means for selecting between a first mode in which the repetition rate of the successive exposures is preferred and a second mode in which the accurate automatic focusing operation for respective exposures is preferred, and means responsive to said selecting means for excluding the function of said detecting means from the camera operation when the second mode is selected by said selecting means.

12. Auto-focus control camera according to claim 1, further comprising a reflex mirror capable of flipping-up and returning-down between a projected position and a retracted position, and wherein said obtaining means includes means for sensing light by way of said reflex mirror in the projected position.

13. Auto-focus control camera according to claim 12, further comprising means related to said adjusting means and said reflex mirror for beginning the focus adjustment and the mirror flip-up operation to occur in a parallel manner after the completion of the information by said obtaining means.

14. Auto-focus control camera according to claim 12, further comprising means related to said effecting means and said reflex mirror for beginning the film winding-up operation and the mirror returning-down operation to occur in a parallel manner after the termination of the camera exposure.

15. Auto-focus control camera according to claim 12, further comprising means for starting the operation of said obtaining means in response to the termination of the returning-down operation of said reflex mirror to automatically repeat the exposure.

16. Auto-focus control camera according to claim 15, further comprising means for selectively disabling said starting means to terminate a camera operation with a single exposure.

17. Auto-focus control camera comprising:
means for photoelectrically obtaining information for auto-focus adjustment, said obtaining means being of a type in which a time taken for said obtaining means to complete the information depends on the scene brightness;
means for measuring scene brightness; and
means for indicating an information relating to the time taken for said obtaining means to complete the information, in response to said measuring means.

18. Auto-focus control camera comprising:
means for photoelectrically obtaining information for auto-focus adjustment, said obtaining means being of a type in which a time taken for said obtaining means to complete the information depends on the scene brightness;
means for measuring scene brightness; and
means for indicating information relating to the time taken for said obtaining means to complete the information, in response to said measuring means, and including means for displaying a value depending on the length of the time taken for said obtaining means to complete the information.

19. Auto-focus control camera comprising:
means for photoelectrically obtaining information for auto-focus adjustment, said obtaining means being of a type in which a time taken for said obtaining means to complete the information depends on the scene brightness;
means for measuring scene brightness; and
means for indicating information relating to the time taken for said obtaining means to complete the information, in response to said measuring means, and including means for comparing the scene brightness measured by said measuring means with a predetermined level and means for warning when scene brightness is less than the predetermined level.

20. Auto-focus control camera according to claim 19, wherein said indicating means further includes means for variably setting the predetermined level.

21. Auto-focus control camera according to claim 20, further comprising means for automatically effecting the film winding-up operation and the exposure to successively repeat a plurality of exposures, and means for directing the repetition rate of the exposures, said setting means being responsive to said directing means.

22. Auto-focus control camera comprising:
means for photoelectrically obtaining information for auto-focus adjustment;

means for adjusting the focus of the camera in accordance with the information;

means for automatically effecting the film winding-up operation and the exposure to successively repeat a plurality of exposures;

means for selecting between a first mode in which the repetition rate of the successive exposures is preferred and a second mode in which the accurate auto-focus operation for respective exposures is preferred;

means for setting the repetition rate of exposures;

means for detecting that the set repetition rate is impossible due to the time necessary for accurately completing the auto-focus adjustment with respect to each exposure;

means responsive to said selecting means for preferring the repetition rate at the sacrifice of the accuracy of the auto-focus adjustment in accordance with said detecting means in said first mode, and for preferring the accuracy of the auto-focus adjustment by decreasing the repetition rate in accordance with said detecting means in said second mode.

23. Auto-focus control camera according to claim 22, wherein said preferring means includes means for causing the exposure within a period determined by the set repetition rate in said first mode, and for causing the exposure after the completion of the accurate auto-focus adjustment in said second mode.

24. Auto-focus control camera according to claim 23, wherein said causing means is adapted to cause the exposure in response to the completion of the film winding-up operation in said first mode.

25. Auto-focus control camera comprising:

means for photoelectrically obtaining information for auto-focus adjustment;

a reflex mirror capable of flipping-up and returning-down between a projected position and retracted position, said obtaining means including means for sensing light by way of said reflex mirror in the projected position;

means for adjusting the focus of the camera in accordance with the information after the completion thereof by said obtaining means; and means related to said adjusting means and said reflex mirror for beginning the focus adjustment and the mirror flip-up operation to occur in a parallel manner after the completion of the information by said obtaining means.

26. Auto-focus control camera comprising:

means for photoelectrically obtaining information for auto-focus adjustment;

a reflex mirror capable of flipping-up and returning-down between a projected position and a retracted position, said obtaining means including means for sensing light by way of said reflex mirror in the projected position;

means for adjusting the focus of the camera in accordance with the information;

means for effecting the film winding-up operation; and means related to said effecting means and said reflex mirror for beginning the film winding-up operation and the mirror returning-down operation to occur in a parallel manner after the termination of the camera exposure.

27. Auto-focus control camera according to claim 26 further comprising means for starting the operation of said obtaining means in response to the termination of the returning-down operation of said reflex mirror to automatically prepare the auto-focus adjustment for the next exposure.

28. Auto-focus control camera comprising:

means for photoelectrically obtaining information for auto-focus adjustment, said obtaining means being of a type in which a time taken for said obtaining means to complete the information depends on the scene brightness;

means for adjusting the focus of the camera in accordance with said information after the completion thereof by said obtaining means;

means for automatically effecting the film winding-up operation to successively repeat a plurality of exposures;

means for setting the repetition rate of exposures;

means for detecting that the set repetition rate is impossible due to a time necessary for accurately completing the auto-focus adjustment, to disable the focus adjustment by said adjusting means; and means for causing the camera exposure in response to the completion of the focus adjustment and the completion of the film winding-up operation without the detection by said detecting means, and in response to the detection by said detecting means and the completion of the film winding-up operation with the detection by said detecting means.

29. Auto-focus control camera according to claim 28, wherein said detecting means includes means for judging that a time depending on the information from said obtaining means plus the time taken for said obtaining means to complete the information exceeds a time depending on the set repetition rate, to detect that the set repetition rate is impossible.

30. Auto-focus control camera according to claim 28, wherein said detecting means includes means for judging that the time taken for said obtaining means to complete the information exceeds a time depending on the set repetition rate.

* * * * *